United States Patent

[11] 3,634,590

[72] Inventors Shingo Inouye;
George Saul, both of Dayton, Ohio
[21] Appl. No. 51,788
[22] Filed July 2, 1970
[45] Patented Jan. 11, 1972
[73] Assignee The United States of America as represented by the Secretary of the Air Force

[54] STABILIZED COPPER ELECTRODE FOR VACUUM ARC FURNACE
4 Claims, 5 Drawing Figs.

[52] U.S. Cl. .................................................. 13/31, 13/18
[51] Int. Cl. ...................................................... H05b 7/08
[50] Field of Search........................................... 335/206; 13/18, 31

[56] References Cited
UNITED STATES PATENTS
| | | | |
|---|---|---|---|
| 3,444,493 | 5/1969 | Niekwhof..................... | 335/206 |
| 3,398,229 | 8/1968 | DeCorso ..................... | 13/18 |

Primary Examiner—Bernard A. Gilheany
Assistant Examiner—R. N. Envall, Jr.
Attorneys—Harry A. Herbert, Jr. and Cedric H. Kuhn ABSTRACT: In a vacuum chamber there is positioned above an open receptacle or mold an electrode comprising three concentric copper tubes and a permanent magnet disposed in the lower end of the inner tube. A heat exchange medium is circulated between the walls of the tubes to provide for cooling of the electrode. A source of direct current is connected to the electrode which directs and conducts an arc onto a metal or alloy to be fused or melted in the mold.

INVENTORS
SHINGO INOUYE
GEORGE SAUL
ATTORNEYS

PATENTED JAN 11 1972
3,634,590
SHEET 2 OF 2
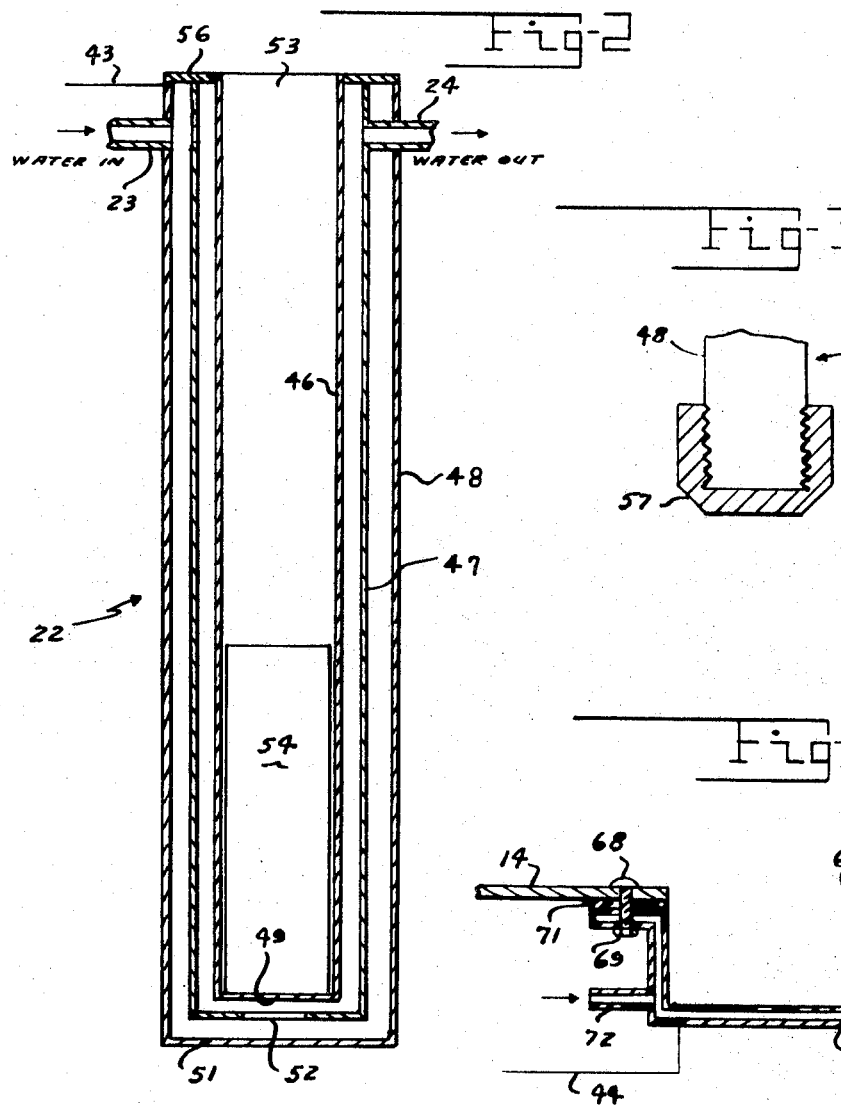
INVENTORS
SHINGO INOUYE
GEORGE SAUL
ATTORNEYS

STABILIZED COPPER ELECTRODE FOR VACUUM ARC FURNACE

FIELD OF THE INVENTION

This invention relates to the vacuum arc melting of metals and alloys. In one aspect, it relates to a vacuum arc melting apparatus having an electrode which directs the arc with a minimum of deviation onto the material to be melted.

BACKGROUND OF THE INVENTION

Various types of vacuum arc furnaces in which an electrode is suspended in a vacuum chamber above a material to be melted are disclosed in the prior art. One of the problems encountered with such furnaces is that the arc often has a tendency to become diffused so that it is not concentrated on the material to be melted. In some instances the arc may even jump to the walls of the vacuum chamber or back and forth between the material and the walls. As a result the efficiency of the arc melting operation may be substantially decreased.

OBJECTS OF THE INVENTION

It is an object of the invention, therefore, to provide a vacuum arc furnace having an electrode which is adapted to direct or focus the arc on the material to be melted.

Another object of the invention is to provide a means for controlling and stabilizing the arc of a vacuum arc furnace.

A further object of the invention is to provide a vacuum arc furnace which is particularly suitable for use in the laboratory investigation of defects in alloy forgings.

Other and further objects and advantages of the invention will become apparent to those skilled in the art upon consideration of the following disclosure and the drawing, in which:

FIG. 2 is an elevational view, partly in cross section, illustrating one embodiment of the electrode of this invention, FIG. 3 is a partial elevational view, partly in cross section, illustrating a preferred embodiment of the electrode;

FIG. 5 is a partial elevational view, in cross section, illustrating another embodiment of the vacuum arc furnace.

SUMMARY OF THE INVENTION

The present invention resides in an electrode which, when used in a vacuum arc furnace, makes it possible to focus or concentrate the arc on the metal or alloy to be melted, welded or consolidated. Broadly speaking, the electrode comprises at least one copper tube, a permanent magnet positioned in the arc-emanating end of the tube, and means for cooling the tube. In a preferred embodiment, the arc-emanating end has a metal cap attached thereto. The metal cap prevents erosion of the copper electrode and is generally formed of the same metal as the metal to be melted. As a result, if erosion of the cap occurs, the metal to be melted is not contaminated with another metal. In another preferred embodiment, the mold in which the metal to be melted is disposed is surrounded by a permanent ring magnet. The permanent magnet in the electrode and the ring magnet are so placed in their poles oppose one another. In a vacuum arc furnace, the arc is inherently unstable, tending to wander and change shape. The magnetic field supplied by the permanent magnet encased in the electrode has the effect of controlling and stabilizing the arc.

Figure 1:
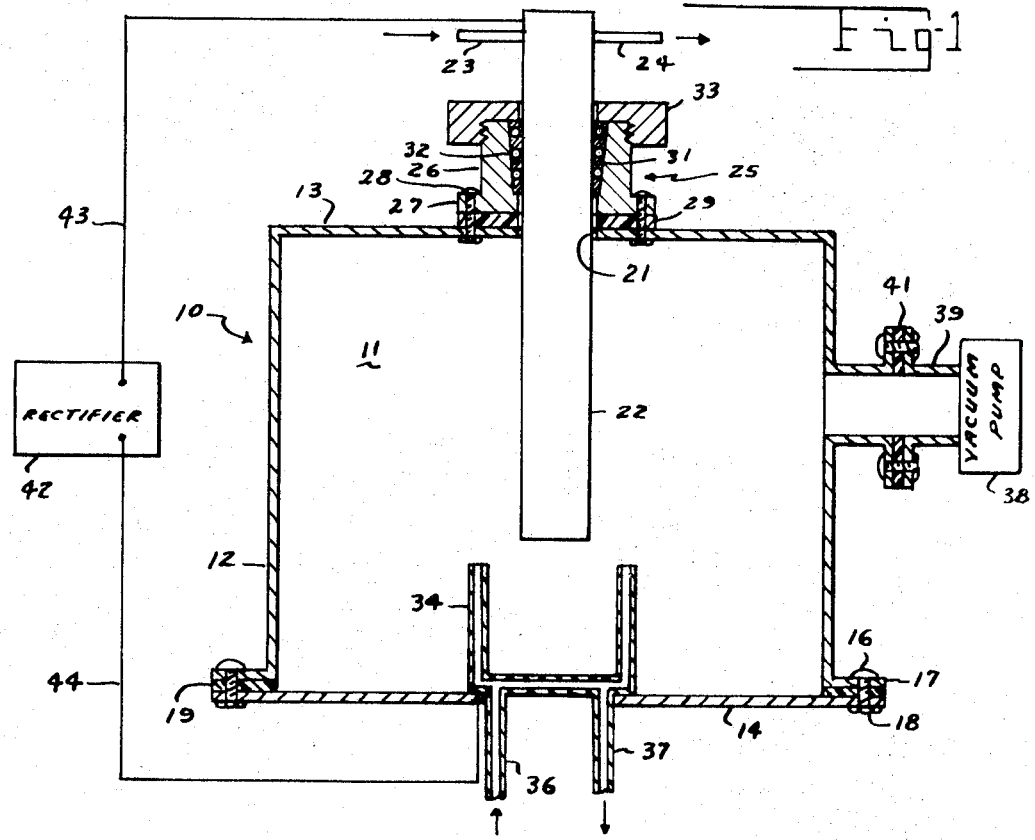
FIG. 1 is an elevational view, partly in cross section, illustrating a vacuum arc furnace.

Referring now to the drawing and in particular to FIG. 1, there is illustrated a vacuum arc furnace 10. The furnace comprises a chamber 11 having a sidewall 12 and upper and lower closure members 13 and 14, respectively. The wall and closure members can be fabricated from a variety of metals, but it is generally preferred to use stainless steel in order to avoid the setting up of a magnetic field. The lower closure member is removable, being attached to wall 12, by means of bolts 16, which pass through flange 17 and member 14, and nuts 18. Disposed between member 14 and flange 17 is a gasket 19 which prevents entry of air or other gases into the chamber. It is to be understood that upper closure member 13 can be similarly attached to sidewall 12.

A central opening 21 is provided in upper closure member 13 through which electrode 22 is suspended so as to extend into chamber 11. Inlet line 23 and outlet line 24 attached to the electrode provide means for the introduction and withdrawal of a coolant that circulates through the electrode. To secure the electrode in a desired vertical position and to prevent entry of air or other gases into the chamber, a packing gland 25 encompasses the upper end of the electrode. The gland comprises a cylindrical member 26 with its upper end threaded and with a flange 27 formed at its lower end. A bolt and nut assembly 28 provides means for securing the cylindrical member to the upper closure member. Positioned between the lower end of the cylindrical member and the closure member is a gasket 29 which functions to prevent seepage of air or other gases between these two members into the chamber. Except for its flange portion, cylindrical member 26 is spaced apart from the electrode to permit the positioning of spacers 31 and O-rings 32 between the electrode and the cylindrical member. The space between the two members is narrower at the bottom than at the top. A capnut 33 is threaded onto the end of cylindrical member 26, providing means for exerting downward pressure on the spacers and O-rings so as to force them into the narrower part of the space between the cylindrical member and electrode and provide an effective seal. By loosening and tightening the capnut, it is possible to adjust the vertical position of the electrode in chamber 11.

Positioned below electrode 22 and resting on lower closure member 14 is a double-walled receptacle or mold 34 in which the material to be melted is placed. The mold is conveniently made of copper because of its high-heat conductivity. Line 36 provides means for introducing a cooling medium, such as water, into the space between the walls of the mold while line 37 is for the withdrawal of the medium.

A vacuum pump 38 is connected to chamber 11 by means of conduit 39. The conduit is shown as being in two parts with a nonconducting material 41 separating the two to prevent grounding of the furnace. The vacuum pump functions to remove gases from chamber 11 so as to maintain a vacuum therein, e.g., below about 10 mm. of mercury.

Direct current is supplied from a suitable power source such as rectifier 42. The rectifier is connected to electrode 22 and mold 34 by cables 43 and 44, respectively. A current of about 750 to 1,500 amperes at 15 to 25 volts is generally used with a 1,000-ampere current at 20 volts being preferred.

Referring now to FIG. 2 of the drawing, copper electrode 22 is shown in detail. In the description of this and the other figures, identical reference numerals are used to designate the same elements. The electrode comprises three concentric, spaced-apart copper tubes, namely, an inner tube 46, an intermediate tube 47, and an outer tube 48. Tubes 46 and 48 are closed at their lower ends by closure members 49 and 51, respectively, while the lower end of tube 47 has an opening 52 formed therein. The upper end 53 of tube 46 is open to permit placement of permanent bar magnet 54 in the bottom of tube 46 or its withdrawal therefrom. The magnet is conveniently formed of Alnico, an alloy containing aluminum, nickel, cobalt and iron. The three tubes are maintained spaced relation with respect to one another by means of ring member 56 which is attached to the upper end of each tube.

Inlet line 23 is attached to the outer tube while outlet line 24 is attached to the intermediate tube to provide means for cooling the electrode. As a result of this arrangement, a coolant, such as water, enters the space between tubes 47 and 48 and subsequently passes into the space between tubes 46 and 47 through opening 52. Continued introduction of water causes it to circulate between the tubes after which it is withdrawn through outlet line 24.

Electrical cable 43 is conveniently attached by suitable means to the upper end of electrode 22. Since the three tubes are interconnected by ring member 56, all three tubes conduct the electrical current for the arc discharge.

In FIG. 3 there is shown a preferred embodiment of the electrode of this invention. A metal cap 57 is attached to the end of outer tube 48 of electrode 22. While any suitable means can be employed to attach the cap, it is preferred to screw the cap on the end of the tube as illustrated in the figure. The purpose of the cap is to prevent contamination of the metal or alloy to be melted in the event that any erosion of the copper electrode occurs. It is preferred, therefore, that the cap be formed of the same metal or alloy that is to be melted or fused. Thus, if any erosion of the cap takes place, the same metal or alloy as that being melted rather than a foreign metal falls into the mold.

Figure 4:
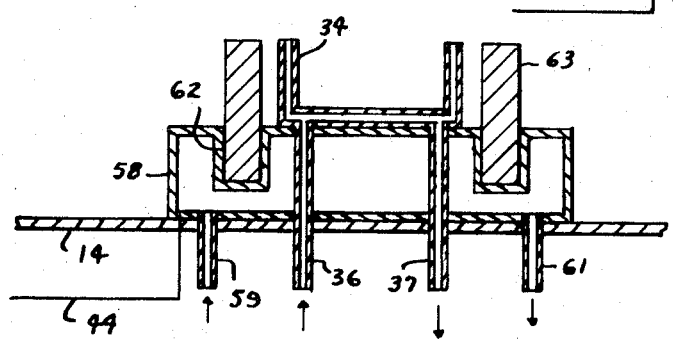
FIG. 4 is a partial elevational view in cross section of the vacuum arc furnace, illustrating another preferred embodiment of the invention.

Referring now to FIG. 4 of the drawing, there is depicted a preferred embodiment of the vacuum arc furnace. Instead of mold 34 resting directly on lower closure member 14 as shown in FIG. 1, the mold is positioned on copper stool 58. The copper stool can be in the form of a closed cylindrical container provided with inlet and outlet lines 59 and 61, respectively, for circulating a coolant through its interior. The top of the stool is provided with an annular groove 62 whose sides are substantially at right angles with one another. Positioned in the annular groove and surrounding mold 34 is a permanent ring magnet 63. The ring magnet and permanent bar magnet 54 (FIG. 2) are so disposed that their poles oppose one another, e.g., with the north pole end of the bar magnet opposite the north pole end of the ring magnet. While good control of the arc can be obtained with use only of the bar magnet, it has been discovered that an even more accurate focusing of the arc emanating from the electrode tip can be obtained when the ring magnet is also utilized.

Referring now to FIG. 5 of the drawing, there is shown another embodiment of the vacuum arc furnace. As illustrated, lower closure member 14 has an opening 64 therein, below which there is disposed a double-walled walled mold having a flange 67. Bolts 68 passing through closure member 14 and flange 67 have nuts 69 threaded on their ends to secure the mold in position. A gasket 71 is disposed between the flange and the closure member to prevent leakage of gases into the vacuum chamber. Inlet and outlet lines 72 and 73, respectively, provide means for circulating a coolant between the walls of the mold.

In the operation of the vacuum arc furnace, shown in FIG. 1, the metal to be melted is placed in mold 34. Air and any other gases present in chamber 11 are evacuated therefrom through conduit 39 by means of vacuum pump 38. A vacuum of less than 10 mm. of mercury is maintained in the chamber through continued operation of the pump. Water is circulated through the double-walled mold and between the concentric tubes of electrode 22. A direct current of about 1,000 amperes at 20 volts is then supplied to the electrode from rectifier 42. An electric arc is thereby generated between the tip of the electrode and the metal in the mold. The arc so generated is stable and does not wander or change shape. Within a few minutes the metal in the mold is melted after which the flow of current is terminated and the mold is cooled. The metal solidifies upon cooling forming an ingot conforming to the shape of the mold. The same procedure is followed when utilizing the other embodiments of the invention as described hereinbefore.

A more complete understanding of the invention can be obtained from a consideration of the following example which is not intended, however, to be unduly limitative of the invention.

EXAMPLE

A run is carried out in the vacuum arc furnace of this invention in order to duplicate the alpha encased voids in a titanium-aluminum-vanadium alloy. The alloy is placed in the mold illustrated in FIG. 4 along with a pellet of titanium nitride. The electrode of FIG. 3 is employed in which the cap is formed of the titanium-aluminum-vanadium alloy. The procedure described above is followed in melting the alloy and titanium nitride pellet. After cooling an ingot is obtained that can be examined to determine if an alpha encased void defect is synthesized by the presence of the titanium nitride.

As will be evident to those skilled in the art, various modifications of this invention can be made or followed in the light of the foregoing disclosure without departing from the spirit or scope of the invention.

We claim:

1. A vacuum arc furnace comprising an enclosed chamber having upper and lower closure members; an electrode comprising at least one copper extending through said upper closure member into said chamber, said tube having a permanent bar magnet positioned in its lower end; means for cooling said tube; a mold positioned below said tube; means for cooling said mold; a permanent ring magnet positioned around said mold; and means for maintaining a vacuum in said chamber.

2. A vacuum arc furnace according to claim 1 in which a direct current power source is connected to said tube and said mold.

3. A vacuum arc furnace according to claim 1 in which said electrode comprises a first copper tube having a closed lower end and an open upper end; a second copper tube positioned within and spaced apart from said first tube, said second tube having a closed lower end with an opening formed therein and an open upper end; a third copper tube positioned within and spaced apart from said second tube, said third tube having a closed lower end and an open upper end; a ring member attached to said upper ends of said first, second and third tubes; a permanent bar magnet positioned in said lower end of said third tube; and in which said cooling means comprises an inlet means attached to said first tube, and an outlet means attached to said second tube.

4. A vacuum arc furnace according to claim 3 in which a metal cap is attached to said closed lower end of said first copper tube.

* * * * *